US007684975B2

(12) United States Patent
Aoki et al.

(10) Patent No.: US 7,684,975 B2
(45) Date of Patent: Mar. 23, 2010

(54) MORPHOLOGICAL ANALYZER, NATURAL LANGUAGE PROCESSOR, MORPHOLOGICAL ANALYSIS METHOD AND PROGRAM

(75) Inventors: Kazuo Aoki, Yokohama (JP); Hiroshi Inokawa, Yokohama (JP); Akihiro Nakayama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 10/777,263

(22) Filed: Feb. 12, 2004

(65) Prior Publication Data
US 2004/0254784 A1    Dec. 16, 2004

(30) Foreign Application Priority Data
Feb. 12, 2003  (JP)  ............... 2003-033220

(51) Int. Cl.
*G06F 17/21* (2006.01)
(52) U.S. Cl. ....................................................... 704/10
(58) Field of Classification Search .................. 704/9, 704/10
See application file for complete search history.

(56) References Cited

U.S. PATENT DOCUMENTS

| 4,701,851 | A | * | 10/1987 | Bass et al. | 715/257 |
| 4,873,634 | A | * | 10/1989 | Frisch et al. | 715/257 |
| 4,887,212 | A | * | 12/1989 | Zamora et al. | 704/8 |
| 5,225,981 | A | * | 7/1993 | Yokogawa | 704/2 |
| 5,323,316 | A | * | 6/1994 | Kadashevich et al. | 704/9 |
| 5,396,419 | A | * | 3/1995 | Morimoto | 704/2 |
| 5,490,061 | A | * | 2/1996 | Tolin et al. | 704/2 |
| 5,649,215 | A | * | 7/1997 | Itoh | 704/9 |
| 5,754,972 | A | * | 5/1998 | Baker et al. | 704/200 |
| 5,805,832 | A | * | 9/1998 | Brown et al. | 711/1 |
| 5,963,893 | A | * | 10/1999 | Halstead et al. | 704/9 |
| 6,073,146 | A | * | 6/2000 | Chen | 715/264 |
| 6,098,035 | A | * | 8/2000 | Yamamoto et al. | 704/9 |
| 6,185,524 | B1 | * | 2/2001 | Carus et al. | 704/9 |

(Continued)

FOREIGN PATENT DOCUMENTS

JP        2002-251402        9/2002

OTHER PUBLICATIONS

H. Trost, "Coping with Derivation in a Morphological Component", In Proceedings of the 6th Conference of the European Chapter of the Association for Computational Linguistics, pp. 368-376, 1993.*

(Continued)

*Primary Examiner*—Talivaldis Ivars Smits
*Assistant Examiner*—Greg A Borsetti
(74) *Attorney, Agent, or Firm*—Novak Druce + Quigg

(57) ABSTRACT

The invention can include a token list generating unit 11 for decomposing a natural language text to be processed into tokens that are components of the natural language text and registering them on a token list, and a token string selecting unit 13 for selecting optimum token strings for composing the natural language text to be processed on the basis of the token list generated by the token list generating unit 11. The token list generating unit 11 registers, on the token list, tokens among the tokens obtained by decomposing the natural language text to be processed except tokens decomposable into smaller tokens according to conditions imposed on the morphological analysis.

8 Claims, 11 Drawing Sheets

U.S. PATENT DOCUMENTS

| | | | | |
|---|---|---|---|---|
| 6,223,150 | B1* | 4/2001 | Duan et al. | 704/9 |
| 6,393,399 | B1* | 5/2002 | Even | 704/257 |
| 6,754,617 | B1* | 6/2004 | Ejerhed | 704/9 |
| 7,107,216 | B2* | 9/2006 | Hain | 704/260 |
| 7,243,305 | B2* | 7/2007 | Schabes et al. | 715/257 |
| 7,349,917 | B2* | 3/2008 | Forman et al. | 707/102 |

OTHER PUBLICATIONS

Oflazer et al, "Morphological Disambiguation by Voting Constraints", In Proceedings of the Thrity-fifth Anual Meeting of the Association for Computational Linguistics and Eighth Conference of the European Chapter of the Association for Computational Linguistics, pp. 222-229, 1997.*

Kwon and Park, 2003 O.-W. Kwon and J. Park, Korean large vocabulary continuous speech recognition with morpheme-based recognition units, Speech Communication 39 (2003) (3-4), pp. 287-300.*

Rudolf Frisch and Antonio Zamora. Spelling assistance for compound words. IBM Journal of Research and Development, 32(2): 195-200, Mar. 1988.*

Carter, D., Kaja, J., Neumeyer, L., Rayner, M., Weng, F., and Wir'en, M. (1996). Handling Compound Nouns in a Swedish Speech-Understanding System. In Proceedings of ICSLP-96, vol. 1, pp. 26-29, Philadelphia, PA.*

Yi-Gyu Hwang, Hyeon-Yeong Lee, Woo-Jeong Bae, Yong-Seok Lee, "Resolution Strategy of Morphological Ambiguity for Korean Parsing" International Journal of Computer Processing of Oriental Languages, vol. 13, No. 2 (2000) 97-112.*

Tamaoka and Hatsuzuka, 1998. K. Tamaoka and M. Hatsuzuka, The effects of morphological semantics on the processing of Japanese two-kanji compound words. Reading and Writing: An Interdisciplinary Journal 10 (1998), pp. 293-322.*

* cited by examiner

| Header Word | Decomposable | Decomposable Flag |
|---|---|---|
| 情 (Information) | Decomposable | 0 |
| 情報 (Information Processing) | Decomposable | 1 |
| 情報処理 (Information Processing Society) | Decomposable | 1 |
| ⋮ | ⋮ | ⋮ |

FIG. 5

MORPHOLOGICAL ANALYZER, NATURAL LANGUAGE PROCESSOR, MORPHOLOGICAL ANALYSIS METHOD AND PROGRAM

CROSS REFERENCE TO RELATED APPLICATIONS

This application claims the benefit of Japanese Application No. 2003-033220, filed in the Japanese Patent Office on Feb. 12, 2003, the entirety of which is incorporated herein by reference.

BACKGROUND

1. Field of the Invention

The present invention relates to the field of natural language analysis using a computer and, more particularly, to a technology for decomposing a sentence into words in a morphological analysis.

2. Description of the Related Art

In natural language analysis using a computer, a sentence is firstly decomposed into words. In a language employing a notation method without separation of words, such as Japanese, the morphological analysis is performed to extract the words composing the sentence.

In such a process of decomposing the sentence into words, it is important to appropriately decompose a complex word consisting of two or more words to form one word, for which there are conventionally various techniques (e.g., refer to Published Unexamined Patent Application No. 2002-251402).

FIG. 11 is a block diagram showing a functional block of the conventional morphological analysis means implemented on the computer, and FIG. 12 is a flowchart for schematically explaining a method of the conventional morphological analysis.

As shown in FIGS. 11 and 12, in the morphological analysis, first of all, a token list generating unit 111 cuts out the character strings of various sizes from a sentence to be processed and obtains all possible tokens (step 1201). A token list on which each token and its attribute (part of speech) are registered is generated by retrieving a master dictionary 112 (step 1202). Herein, the token is the minimum element composing the sentence or word. For example, the word "morphology" has tokens of "mor", "morpho", "morphology", "pho" and "logy".

Then, a token string selecting unit 113 references a grammar dictionary 114, and selects an optimum token string from among the combinations of all possible tokens detected at step 1201 (step 1203).

Thereafter, a complex word decomposition processing unit 115 matches the token string selected at step 1203 with a complex word dictionary 116, and decomposes decomposable tokens into smaller tokens (step 1204).

Problems To Be Solved By The Invention

As described above, since the conventional morphological analysis involved selecting a token string and then decomposing a complex word, it took more time to make the matching process for the complex word, and this time was longer as more complex words were contained in the sentence.

Also, since the conventional morphological analysis involved selecting a suitable token string and then decomposing the complex word, there was a drawback that the token string from the decomposed words (tokens) was not assured to be optimum.

Moreover, since the complex word dictionary referenced in decomposing the complex word comprises the part of speech information and the delimiter position information for the complex word and the words composing the complex word, it took a lot of time to make the generation or maintenance operation.

Thus, it is an object of this invention to provide efficient decomposition processing of a complex word in processing of decomposing a sentence into words in the morphological analysis to enhance the execution efficiency of the overall processing.

Another object of the present invention is to provide efficient decomposition processing of a complex word in processing of decomposing a sentence into words in a morphological analysis and to enable an assurance of optimum token strings obtained as an analysis result when the complex word is decomposed.

Also, it is another object of this invention to enable an assurance of optimum token strings obtained as an analysis result when the complex word is decomposed.

Moreover, it is a further object of the invention to reduce the time needed to generate and maintain the complex word dictionary.

SUMMARY OF THE INVENTION

In order to accomplish the above object, the present invention is implemented as a morphological analyzer as configured in the following manner. This morphological analyzer can include a dictionary unit storing header words and attribute information of the header words, a token list generating unit for referencing data in the dictionary unit, extracting tokens that can form the natural language text from the natural language text to be processed, and registering them on a token list, and a token string selecting unit for selecting optimum token strings for composing the natural language text to be processed on the basis of the token list generated by the token list generating unit. The token list generating unit can control the registration of the tokens on the token list on the basis of conditions imposed on the morphological analysis and the attribute information of the header words corresponding to the extracted tokens.

More particularly, this registration control is implemented by registering only the tokens having the attributes consistent with the conditions imposed on the morphological analysis on the token list. More particularly, the attribute information is recorded with the flag data having a number of bits corresponding to the number of attribute information, and the token list generating unit decides whether or not to register the tokens on the token list on the basis of the value of the flag data.

Also, another morphological analyzer of the invention comprises token list generation means for decomposing the natural language text to be processed into tokens that are components of the natural language text and registering them onto a token list except tokens decomposable into smaller tokens, and token string selection means for selecting optimum token strings for composing the natural language text to be processed on the basis of the token list generated by the token list generation means.

In order to accomplish the above object, another invention is implemented as a natural language processor comprising morphological analysis means and application execution means for performing given processing for the natural language text morphologically analyzed. In the natural language processor, the morphological analysis means includes a dictionary unit storing header words and attribute information on the header words, a token list generating unit for referencing data in the dictionary unit, extracting tokens that can form the natural language text from the natural language text to be processed, and registering only tokens having attributes matching conditions requested by the application execution means on a token list on the basis of the attribute information of the header words corresponding to the extracted tokens, and a token string selecting unit for selecting optimum token strings for composing the natural language text on the basis of the token list generated by the token list generating unit. Through the use of the application execution means, text retrieval processing, machine translation processing and text mining processing are realized.

Further, in order to accomplish the above object, another invention is implemented as a morphological analysis method of performing a morphological analysis on a natural language text by using a computer. This morphological analysis method comprises the steps of inputting a natural language text to be processed, referencing a dictionary stored in a memory, obtaining tokens that can form the natural language text and attribute information of the tokens, and storing them in a work area of the memory. The morphological analysis also can include selecting given tokens out of the tokens stored in the memory on the basis of given conditions imposed on the morphological analysis and the attribute information of the tokens, registering them on a token list formed in a given area of the memory, generating token strings that can form the natural language text to be processed on the basis of the token list and storing them in the work area of the memory. The morphological analysis further can include selecting optimum token strings for composing the natural language text to be processed out of the token strings stored in the memory and outputting them.

Also, another morphological analysis method of the invention comprises a step of inputting a natural language text to be processed, decomposing it into tokens that are components of the natural language text, and storing the obtained token group in a work area of a memory. The morphological analysis can include a step of registering the token group on a token list formed in a given area of the memory except tokens decomposable into smaller tokens, a step of generating token strings that can form the natural language text to be processed on the basis of the token list and storing them in the work area of the memory, and a step of selecting optimum token strings for composing the natural language text to be processed out of the token strings stored in the memory and outputting them.

Moreover, this invention can be implemented as a program for controlling a computer to implement the functions of the morphological analyzer or the natural language processor as described above, or a program for enabling a computer to perform the process corresponding to each step of the morphological analysis method. This program may be provided by storing the program in a magnetic disk, an optical disk, a semiconductor memory, any other recording medium, or distributed via a network.

BRIEF DESCRIPTION OF THE DRAWINGS

FIG. 5 is a table showing an exemplary data format in a master dictionary in this embodiment;

DETAILED DESCRIPTION OF THE INVENTION

The preferred embodiments of the present invention will be described below in detail with reference to the accompanying drawings.

Figure 1:
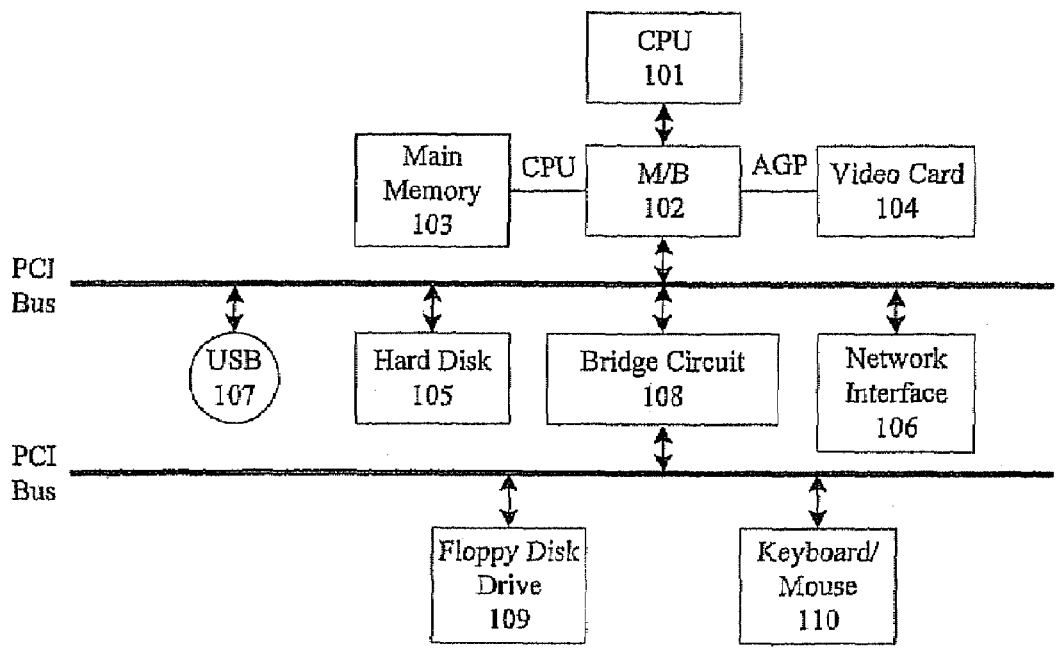
FIG. 1 is a block diagram showing a typical example of the hardware configuration of a computer apparatus suitable for executing a morphological analysis according to an embodiment of the invention.

FIG. 1 is a block diagram showing a typical example of the hardware configuration of a computer apparatus suitable for performing a morphological analysis according to one embodiment of the invention.

The computer apparatus as shown in FIG. 1 comprises a CPU (Central Processing Unit) 101 as operation means, a main memory 103 connected via an M/B (Mother Board) chip set 102 and a CPU bus to the CPU 101, a video card 104 connected via the M/B chip set 102 and an AGP (Accelerated Graphics Port) to the CPU 101, a hard disk 105, a network interface 106 and a USB port 107 connected via a PCI (Peripheral Component Interconnect) bus to the MIB chip set 102, a floppy disk drive 109 and a keyboard/mouse 110 connected via the PCI bus, a bridge circuit 108 and a low speed bus such as an ISA (Industry Standard Architecture) bus to the M/B chip set 102.

FIG. 1 exemplifies one possible hardware configuration of a computer apparatus for realizing this embodiment, but various other configurations may be used so far as this embodiment is applicable. For example, instead of providing the video card 104, only a video memory may be mounted to process the image data in the CPU 101, or a CD-ROM (Compact Disc Read Only Memory) or DVD-ROM (Digital Versatile Disc Read Only Memory) drive may be provided via an interface such as ATA (AT Attachment).

Figure 2:
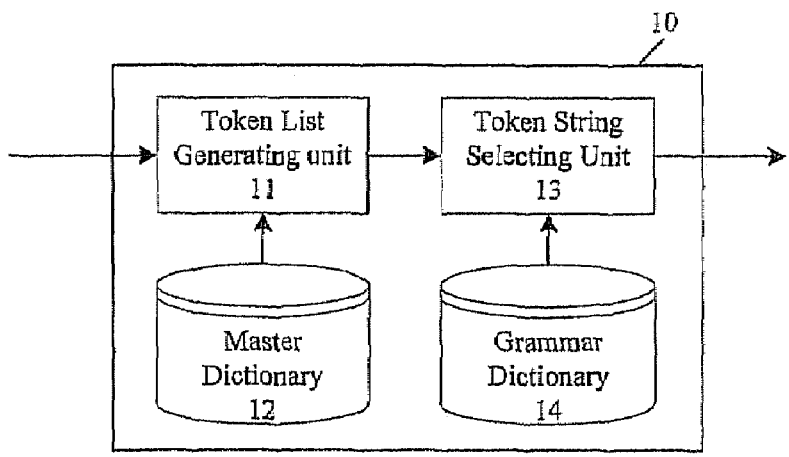
FIG. 2 is a diagram showing a functional configuration of a morphological analysis engine according to the embodiment.

FIG. 2 is a block diagram showing a functional configuration of a morphological analysis engine according to an embodiment of the invention.

As shown in FIG. 2, the morphological analysis engine 10 of this embodiment comprises a token list generating unit 11 for decomposing a sentence to be processed into tokens and generating a token list regarding the tokens, a master dictionary 12 employed by the token list generating unit 11, a token string selecting unit 13 for selecting an optimum token string on the basis of the generated token list, and a grammar dictionary 14 employed by the token string selecting unit 13.

Among the above units, the token list generating unit 11 and the token string selecting unit 13 are virtual software blocks implemented by controlling the CPU 101 with a program expanded in the main memory 103 as shown in FIG. 1. The program for implementing these functions by controlling the CPU 101 may be provided by being stored in a magnetic disk, an optical disk, a semiconductor memory, any other recording medium, or distributed via a network. In this embodiment, the program is entered via the network interface 106 or the floppy disk drive 109, as shown in FIG. 1, or the CD-ROM drive, not shown, and stored in the hard disk 105. The program stored in the hard disk 105 can be read into the main memory 103, expanded, and executed by the CPU 101 to implement the functions described herein.

Also, the master dictionary 12 and the grammar dictionary 14 can be installed in the main memory 103 and the hard disk 105 as shown in FIG. 1. The master dictionary 12 for processing by the token list generating unit 11, or the grammar dictionary 14 for processing by the token string selecting unit 13 is read from the hard disk 105 into the main memory 103. The master dictionary 12 or the grammar dictionary 14 can be referenced by the CPU 101 to function as the token list generating unit 11 or the token string selecting unit 13.

The morphological analysis engine 10 of this embodiment takes into consideration a complex word at the stage of generating a token list, rather than decomposing the complex word after selecting the token string as in the conventional morphological analysis. Thereby, if the token string is selected from the generated token list, the complex word is decomposed, and the optimum token string is selected.

Whether or not to decompose the complex word, is selected upon a request from the application making use of the result of morphological analysis. For example, in the context of document retrieval or text mining, it often may be favorable to decompose the complex word minutely so as to detect (hit) as many relevant items as possible. On the other hand, in machine translation, it often may be favorable to deal with the complex word directly without decomposing it, because the meaning of the complex word is changed by decomposing it. Accordingly, the decomposition of the complex word in the morphological analysis is performed selectively (based on the optional settings of the application) upon a request from the application.

In the above configuration, the token list generating unit 11 cuts out a character string composing a sentence to be processed, and obtains all possible tokens. It generates the token list by referencing the master dictionary 12. In this embodiment, the token list generating unit 11 registers the token on the token list except tokens corresponding to the complex word, when the morphological analysis by decomposing the complex word is set. That is, it controls the registration of tokens onto the token list depending on the attribute of the token. A specific example is shown in the following.

Consider an instance of generating the token list for the sentence, or part of a sentence, "Information Processing Society Aoki Kazuo (情報処理学会で青木和夫の)".

Figure 3:
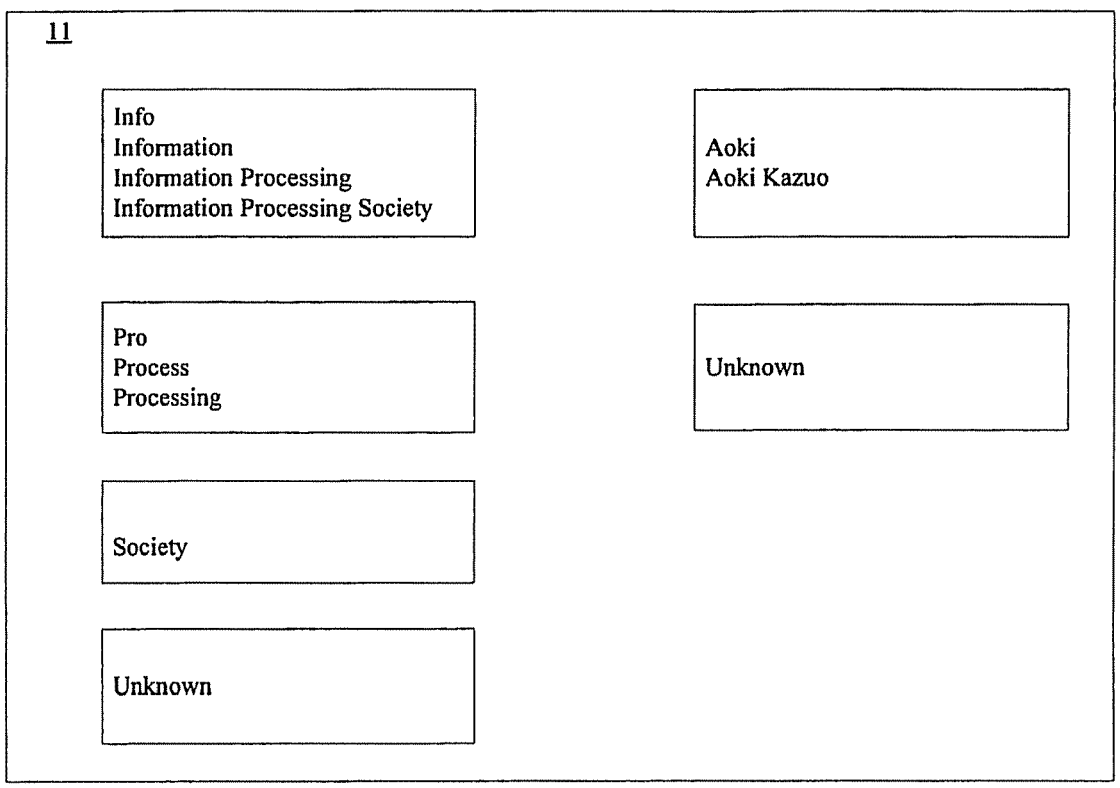
FIG. 3 is a diagram showing an exemplary token list in which the complex word is not decomposed.

FIG. 3 is a diagram showing the token list when the complex word for this illustrative sentence is not decomposed. When the complex word is not decomposed, for the words "Information Processing Society (情報処理学会)", for example, the character strings "Info (情)", "Information (情 報)", "Information Processing (情報処理)", and "Information Processing Society" are extracted as the tokens, and registered on the token list, together with the part of speech information acquired from the master dictionary 12.

Figure 4:
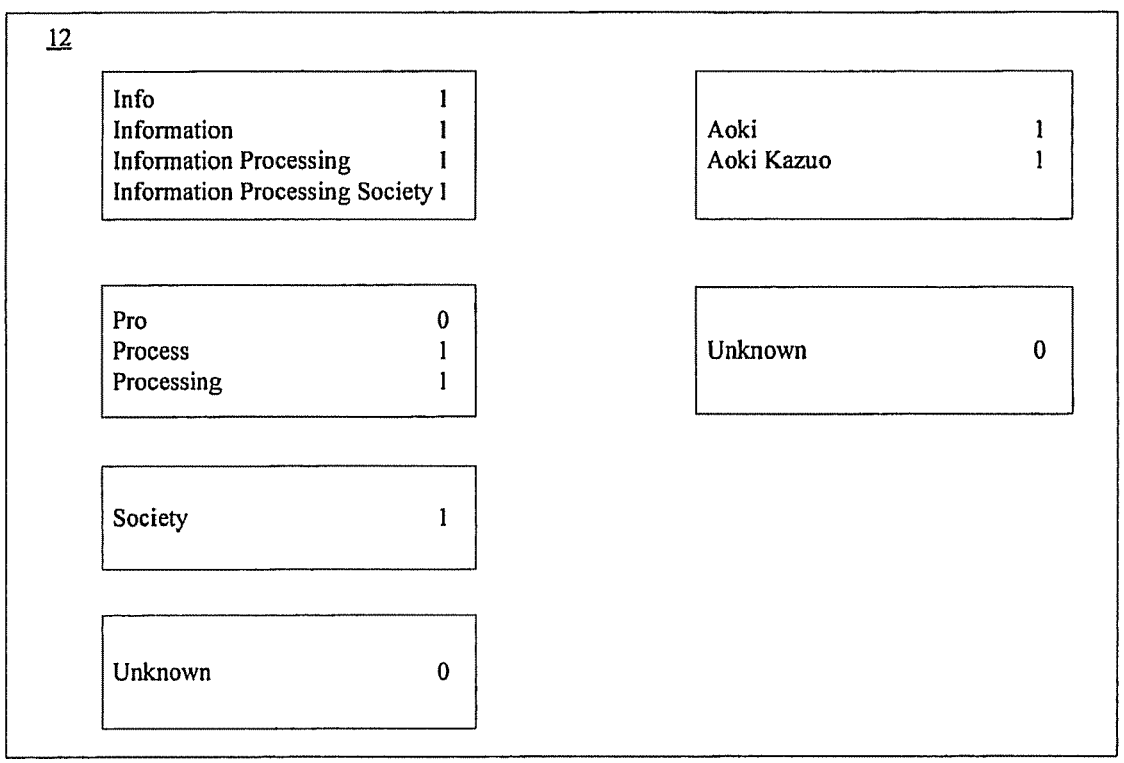
FIG. 4 is a diagram showing an exemplary token list in which the complex word according to the embodiment is decomposed for the same illustrative sentence as in FIG. 3.

FIG. 4 is a diagram showing the token list when the complex word is decomposed for the same illustrative sentence.

When the complex word is decomposed, among the character strings cut out of the words "Information Processing Society", the "Information Processing" and "Information Processing Society" are complex words, and not registered on the token list (as will be clear from the comparison between FIGS. 3 and 5, "Information Processing", "Information Processing Society" and "Aoki Kazuo (青木和夫)" are removed as the complex word). Whether or not the words "Information Processing" and "Information Processing Society" are complex words is judged based on the information registered in the master dictionary 12.

The master dictionary 12 has the token and the token relevant information registered in association with each other.

FIG. 5 is a table showing an exemplary data format in the master dictionary 12.

As shown in FIG. 5, the master dictionary 12 has registered the part of speech information of each header word (token) and a flag indicating whether or not the header word is decomposable (decomposable flag) (the information including the header word itself is hereinafter referred to as token information). The part of speech information in the master dictionary may include the information indicating the attributes such as person's name, place name and organization name, though they do not correctly involve the kind of part of speech. In the shown example, the header word is not decomposable after the value of decomposable flag is registered as 0, or decomposable after it is registered as 1. The token list generating unit 11 references this flag, judges whether or not the character string of token is decomposable (complex word), and if decomposable, does not register the token on the token list, when the decomposition of complex word is set.

In this embodiment, the attribute information indicating whether or not the character string of the token is a decomposable complex word is only given by the above flag, but various other attribute information can be given to tokens by extending this flag. For example, in the case where four pieces of information a, b, c and d are represented by the flag data of four bits, if a is 1 (0001), b if 2 (0010), c is 4 (0100) and d is 8 (1000), the complex attribute is represented by bit combination such as ab 3 (0011) or bcd 14 (1110). The tokens having the flag value indicating the attribute consistent with the conditions (decomposing the complex word) imposed on the morphological analysis process are only registered on the token list. Accordingly, it is possible to control the registration on the token list under the complex conditions where the person's name is not decomposed even though it is the complex word.

Figure 6:
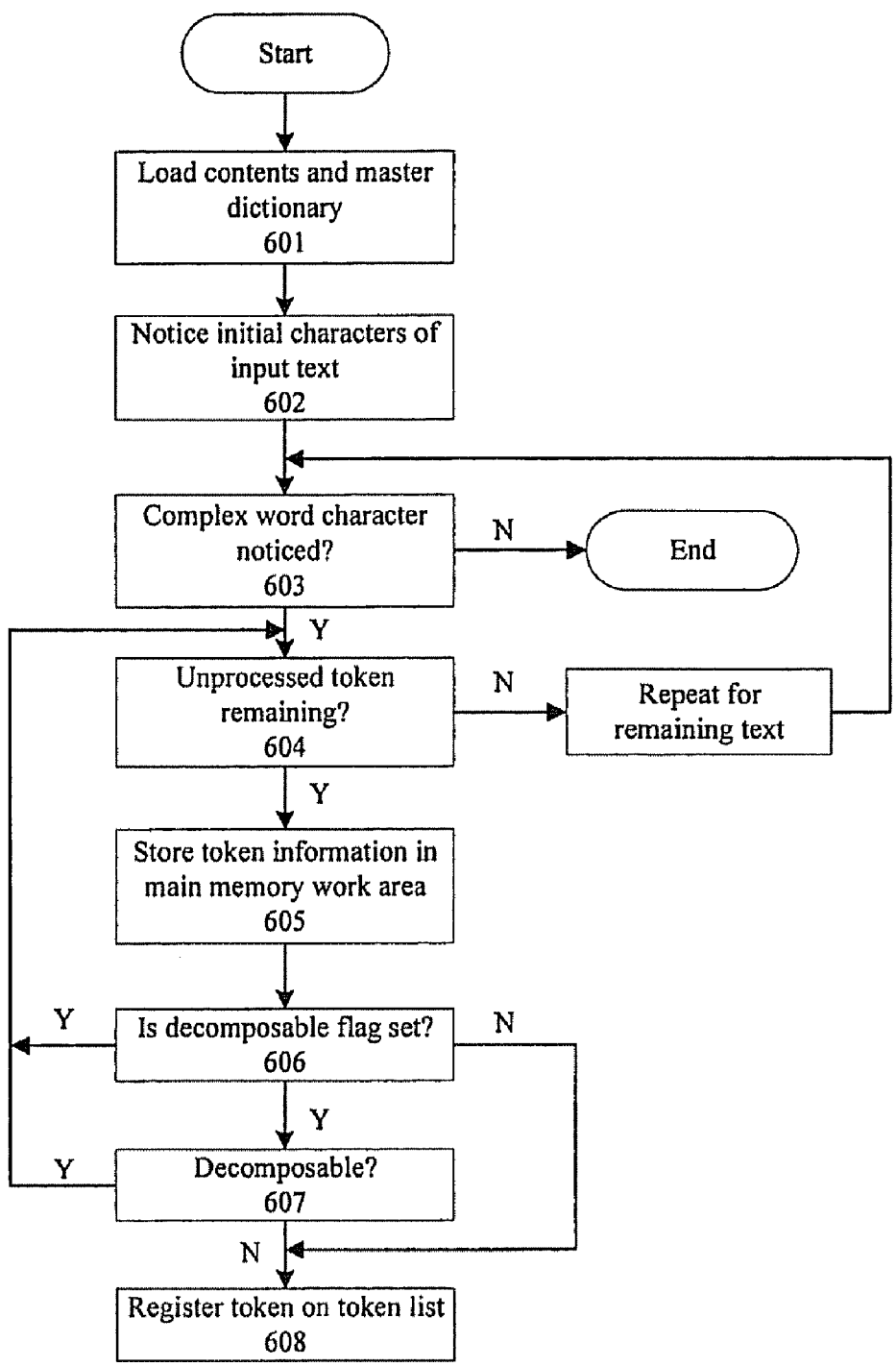
FIG. 6 is a flowchart for explaining an operation of generating the token list in this embodiment.

FIG. 6 is a flowchart for explaining an operation of the token list generating unit 11 to reference the master dictionary 12 as configured above and generate the token list.

Referring to FIG. 6, first of all, in the initial operation, a sentence (text) to be processed is input, and the contents of the master dictionary 12 are loaded from the hard disk 105 to the main memory 103 (step 601). At this time, an area for the token list is kept in the main memory 103. Before the token list generating unit 11 starts the process, an option setting for whether to decompose the decomposable complex word is made. This setting is made by accepting the input of a setting command in a user interface of the application using the morphological analysis engine 10 of this embodiment.

If the text to be processed is input, the token list generating unit 11 takes a notice of the initial characters of the input text (step 602), reads the token information of each token beginning with the noticed character from the master dictionary 12 successively, and stores it in a work area of the main memory 103 (steps 603, 604, and 605).

For example, in processing the sentence "Information Processing Society Aoki Kazuo" as described above, the initial characters "Info" are noticed, and the token information "Info—noun", "Information—noun", "Information Processing—noun" and "Information Processing Society—noun" are read out.

If the option setting of decomposing the complex word is on, the token list generating unit 11 checks the decomposable flag of the token information read from the master dictionary 12, held in the work area of the main memory 103, to see whether or not the token is decomposable (steps 606, 607). If the token is not decomposable, or the option setting of decomposing the complex word is off, the token is registered on the token list prepared in the main memory 103 (step 608). Turning back to step 604, it is checked whether or not there is an unprocessed token left. If there is an unprocessed token left, the same processing (steps 605 to 608) can be performed for the unprocessed token(s).

When the characters "Info" are noticed, the read four token information "Info—noun", "Information—noun", "Information Processing—noun" and "Information Processing Society—noun" are registered on the token list.

On the other hand, if the token is decomposable at step 607, the token is not registered on the token list, and the procedure goes back to step 604 to check whether or not there is an unprocessed token left.

In the above example, since "Information Processing—noun" and "Information Processing Society—noun" are decomposable, "Info—noun" and "Information—noun" are only registered on the token list.

The above processing (steps 605 to 608) is performed for all the tokens beginning with the noticed character, the noticed character is shifted one position backward of the input text, and the procedure returns to step 603 (step 609) to repeat the same processing (steps 604 to 608). If the above processing is completed for all the characters in the input text as the noticed characters, the token list generating unit 11 ends the processing (step 603).

In processing the sentence "Information Processing Society Aoki Kazuo", the characters "Info" are noticed, then the characters "mation" are noticed, and the characters are processed successively in the same manner. After the last characters "Kazuo" are noticed and processed, the token list generating unit 11 ends the processing.

The token string selecting unit 13 is the same as that of the conventional morphological analysis engine. That is, it references the grammar dictionary 14 and selects the most possible (optimum) token string from the token list generated by the token list generating unit 11. For selection of the token string, an ordinary connection cost minimizing method may be employed.

The grammar dictionary 14 for use in processing the token string selecting unit 13 is the same as that of the conventional morphological analysis engine. That is, it stores the grammar data in which the way of connecting the words and the preset cost for each way of connection are defined.

Figure 7:
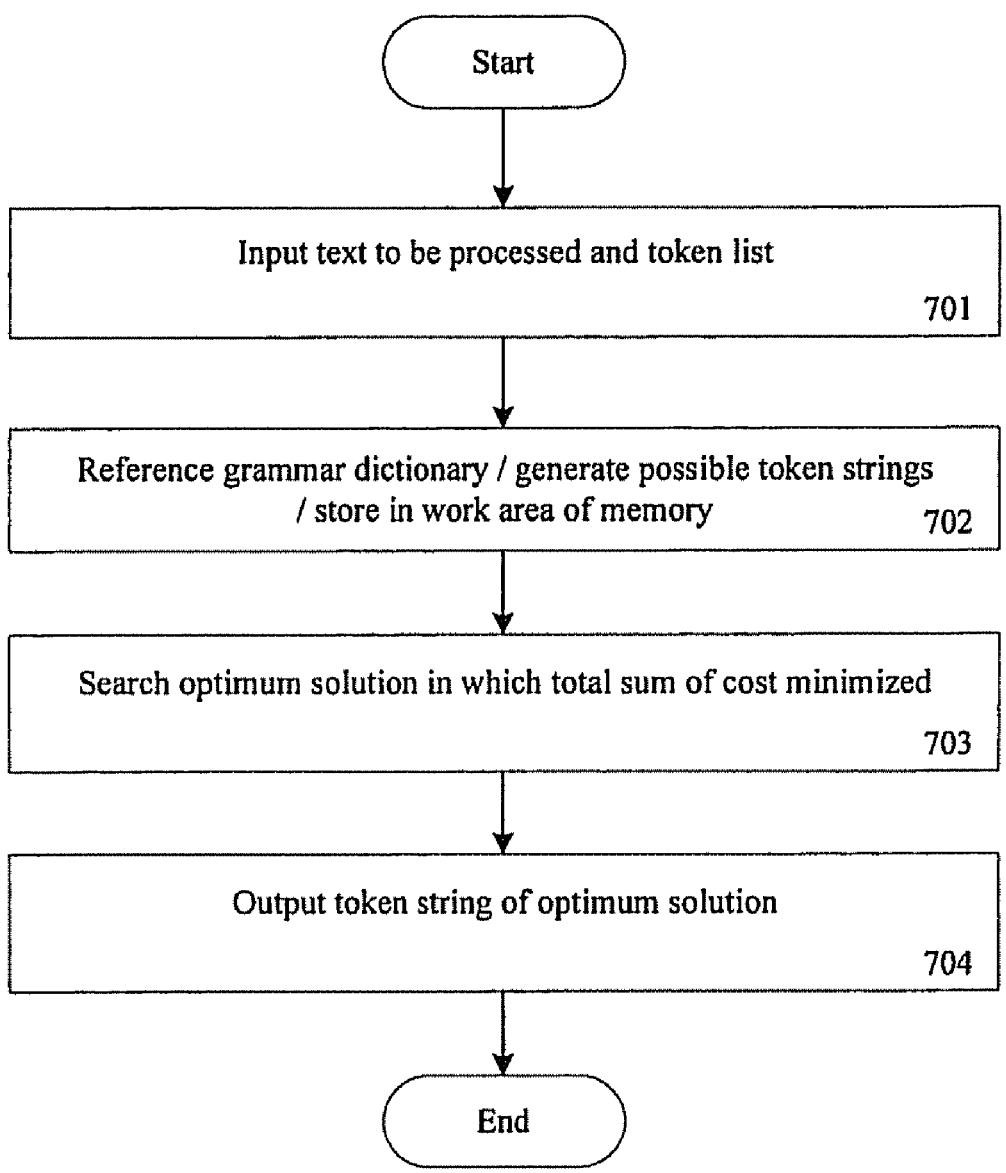
FIG. 7 is a flowchart for explaining a process of a token string selecting unit in this embodiment.

FIG. 7 is a flowchart for explaining a process of the token string selecting unit 13. When the process is started, as the initial operation, the contents of the grammar dictionary 14 are loaded from the hard disk 105 to the main memory 103.

As shown in FIG. 7, first of all, the token string selecting unit 13 inputs the text to be processed and the token list generated by the token list generating unit 11 (Step 701). The token string selecting unit 13 references the grammar dictionary 14, generates possible token strings from the beginning to the end of the input text, and stores them in the work area of the memory (step 702).

In the sentence "情報処理学会で青木和夫の", for example, the token strings 情報処理学会-で-青木和夫-の (when the complex word is not decomposed), 情報-処理-学会-で-青木-和夫-の情-報-処-理-学-会-で-青-木-和-和-の are obtained.

The token string selecting unit 13 references the grammar dictionary to obtain the cost for the way of connecting the tokens making up the token string, with the generated token string as a candidate solution (path), and searches the optimum solution (shortest path) in which the total sum of cost is minimized (step 703). For this search, a well-known Dikstra algorithm may be employed.

Lastly, the token string selecting unit 13 outputs the token string of optimum solution as the optimum token string for the input text (step 704).

The above process of the token string selecting unit 13 is the same as that of the conventional morphological analysis engine. However, when the morphological analysis is performed with the setting of decomposing the decomposable complex word, the number of combinations (paths) to be processed is smaller than in the conventional morphological analysis, because any unnecessary complex word(s) are removed from the token list at the stage of generating the token list in the token list generating unit 11 as described above. Accordingly, the processing by the token string selecting unit 13 is made faster.

Also, in the conventional morphological analysis engine, when the morphological analysis was performed with the setting of decomposing the decomposable complex word, the matching of the token string selected by the token string selecting unit 13 with the complex word in the dictionary was performed, and the decomposable complex word included in the token string was decomposed. Therefore, the used amount of storage device (resource) such as memory or hard disk was increased by the amount of the complex word dictionary, and it took excess time to decompose the complex word in executing the morphological analysis process.

On the contrary, in the morphological analysis engine 10 of this embodiment, when morphological analysis is performed with the setting of decomposing the decomposable complex word, none of the tokens of the complex word are registered on the token list generated by the token list generating unit 11 to handle the decomposition of the complex word, whereby there is no need for preparing the complex word dictionary in addition to the master dictionary, reducing the used amount of storage device (resource). In executing the morphological analysis process, since there is no need for decomposing the complex word, as well as generating the token list and selecting the token list, it takes a shorter time to perform the process.

Moreover, the conventional morphological analysis engine decomposes the decomposable complex word, after selecting the optimum token string as described above, whereby the optimum token string is obtained when the complex word is directly dealt with as itself, and the token string is not assured to be optimum in a state where the complex word is decomposed.

On the contrary, in the morphological analysis engine 10 of this embodiment, when the morphological analysis is performed with the setting of decomposing the decomposable complex word, the token list generated by the token list generating unit 11 does not contain the tokens of the complex word, whereby the token string containing the tokens of the complex word is not to be processed by the token string selecting unit 13. Accordingly, it is assured that the token string selected by the token string selecting unit 13 by no means contains the tokens of the complex word, and is optimum.

The application using the morphological analysis engine 10 of this embodiment will be described below.

The morphological analysis engine 10 is realized as a morphological analyzer for the natural language sentence which is mounted on the computer apparatus, and employed for various applications making the natural language processes such as a text retrieval system, a machine translation system and a text mining system.

Figure 8:
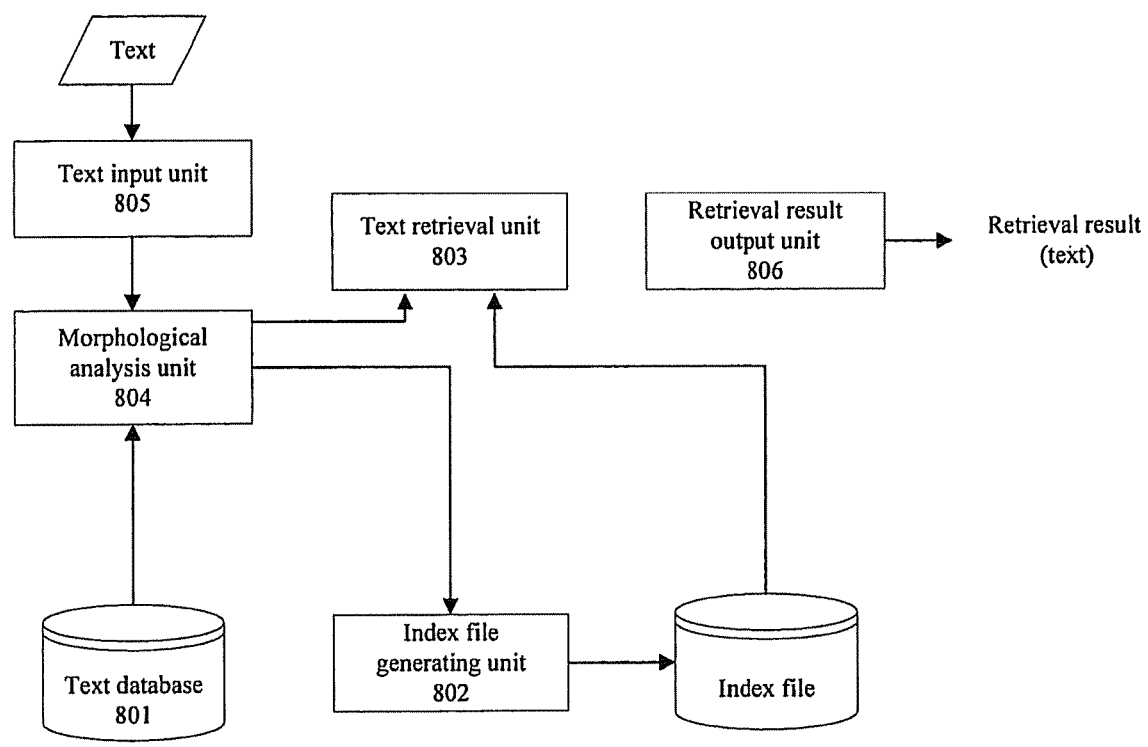
FIG. 8 is a block diagram showing an exemplary configuration of a text retrieval system mounting the morphological analysis engine according to this embodiment.

FIG. 8 is a block diagram showing an exemplary configuration of a text retrieval system mounting the morphological analysis engine 10.

Referring to FIG. 8, this text retrieval system comprises a text database 801 storing a text group of retrieval objects, an index file generating unit 802 for generating an index file of keywords from each text stored in the text database 801, a text retrieving unit 803 for retrieving the sentence that is a retrieval term for the text group of retrieval objects using the index file, a morphological analysis unit 804 for performing the morphological analysis as the preprocessing for the index file generating unit 802 and the text retrieving unit 803, a text input unit 805 for inputting the sentence that is the retrieval term, and a retrieval result output unit 806 for outputting the retrieval result.

This text retrieval system is implemented on one or more computer apparatuses connected via the network. In the configuration as shown in FIG. 8, the text database 801 is implemented in the storage means such as hard disk, and the index file generating unit 802 and the text retrieval unit 803 for performing the application of text retrieval are implemented by the CPU under program control. Also, the morphological analysis engine 10 of this embodiment can be used as the morphological analysis unit 804 may be employed. The text input unit 805 is implemented by a keyboard, a mouse or other input device, and the retrieval result output unit 806 can be implemented by a display device. Also, the sentence of a retrieval term may be input to or the retrieval result may be output from an external device via the network interface.

In this text retrieval system, the morphological analysis is performed in generating the index file and performing the text retrieval.

In generating the index file, first of all, the text is sequentially read from the text database 801, and the morphological analysis is performed by the morphological analysis unit 804. At this time, when the complex word is desired to be decomposed from the necessity of the text retrieval (application), the optimum token string is selected from among the token strings not containing the complex word, as shown in FIGS. 6 and 7. From the obtained token strings, the tokens (words) of independent words such as a noun or adjective are only extracted as a keyword by the index file generating unit 802. And the index file with the keyword registered is generated for each text of retrieval object.

In performing the text retrieval, first of all, the sentence of a retrieval term is input by the text input unit 805, and the morphological analysis of the input sentence is made by the morphological analysis unit 804. At this time, when the complex word is desired to be decomposed from the necessity of the text retrieval (application), the optimum token string is selected from among the token strings not containing the complex word, as shown in FIGS. 6 and 7. From the obtained token strings, the tokens (words) of independent words such as nouns or adjectives are only extracted by the text retrieval unit 803. Employing the index file, the text containing the extracted tokens is retrieved. The text hit by this retrieval is read from the text database 801, and output (displayed) on the retrieval result output unit 806.

Figure 9:
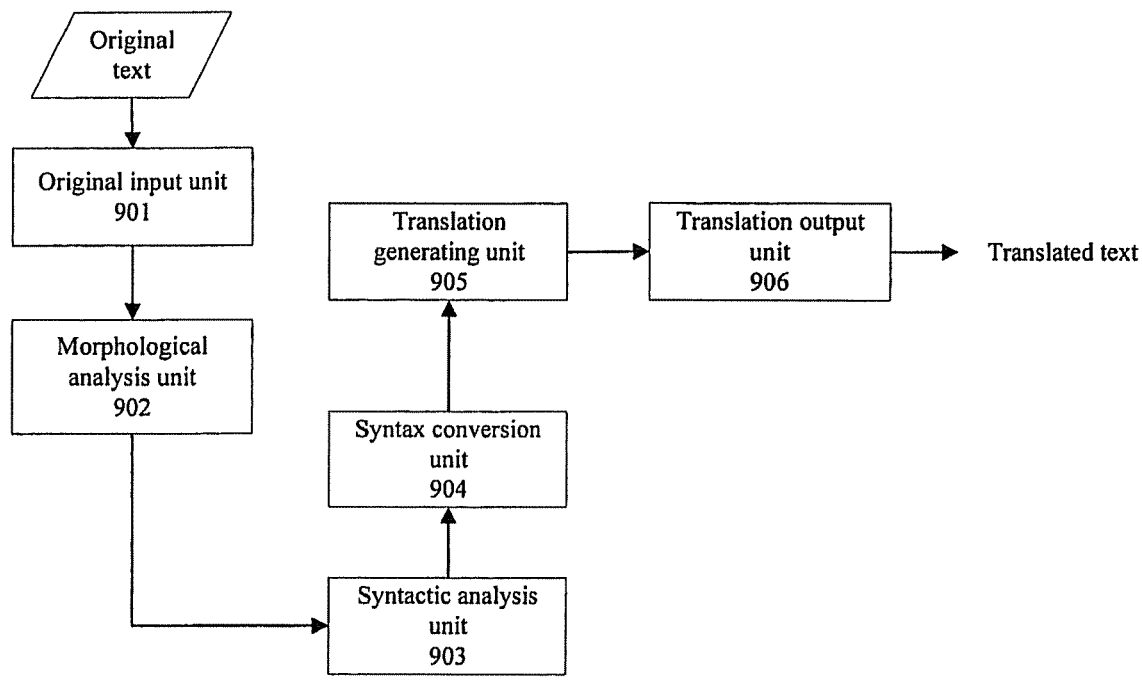
FIG. 9 is a block diagram showing an exemplary configuration of a machine translation system mounting the morphological analysis engine according to this embodiment.

FIG. 9 is a block diagram showing an exemplary configuration of a machine translation system mounting the morphological analysis engine 10.

Referring to FIG. 9, this machine translation system comprises an original input unit 901 for inputting an original text to be translated, a morphological analysis unit 902 for making the morphological analysis for the input original text, a syntactic analysis unit 903 for making the syntactic analysis for the original text morphologically analyzed, a syntax conversion unit 904 for making the syntax conversion from the sentence structure of the original text into the sentence structure of a translation language on the basis of the result of syntactic analysis, a translation generating unit 905 for generating a translated text on the basis of the sentence structure obtained as a result of syntax conversion, and a translation output unit 906 for outputting the translated text generated. Though specifically not shown, the word dictionary and the grammar dictionary are prepared in each of the original and translation languages and utilized for each of the processes.

This machine translation system can be implemented on one or more computer apparatuses connected via the network. In the configuration as shown in FIG. 9, the morphological analysis engine 10 of this embodiment can be used as the morphological analysis unit 902 may be employed. The syntactic analysis unit 903, the syntax conversion unit 904 and the translation generating unit 905, which are means for executing the application of machine translation, are implemented by the CPU under program control. Also, the original input unit 901 is implemented by a keyboard, a mouse or other input device, and the translation output unit 906 can be implemented by a display device. Also, the original text may be input to or the translation text may be output from an external device via the network interface.

In the machine translation, since the accuracy of translation is greatly varied by adjusting the way of translation depending on the attribute of word, such as whether or not to decompose the complex word, it is preferable to enable the detailed setting to be made. With the morphological analysis unit 902 using the morphological analysis engine of this embodiment, unnecessary tokens (having the attribute inconsistent with the setting) are excluded in accordance with such setting at the stage of generating the token list, and the optimum token string is obtained from the remaining tokens.

Figure 10:
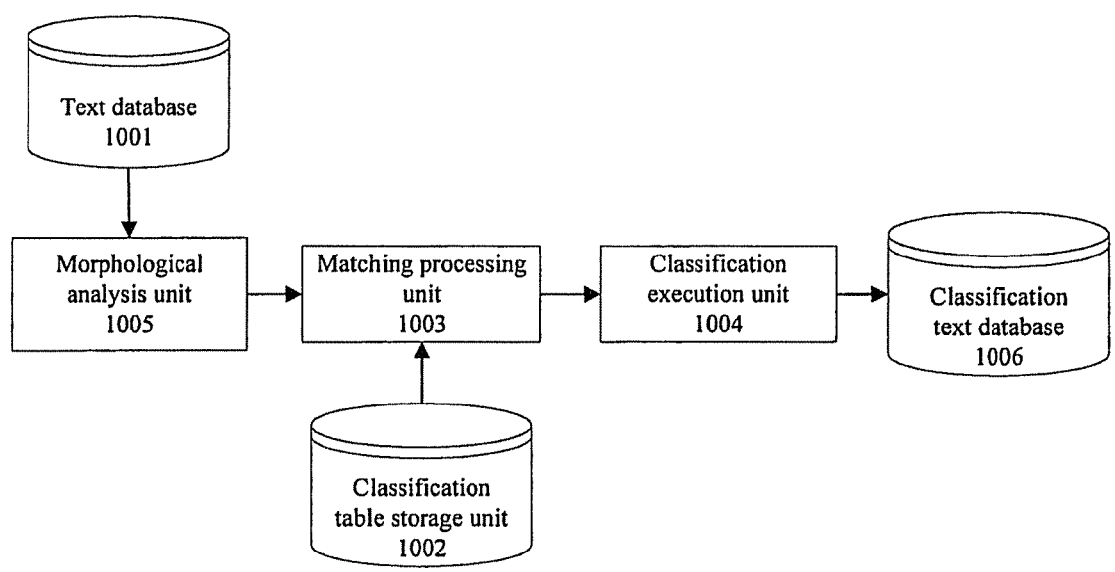
FIG. 10 is a block diagram showing an exemplary configuration of a text mining system mounting the morphological analysis engine according to this embodiment.
Figure 11:
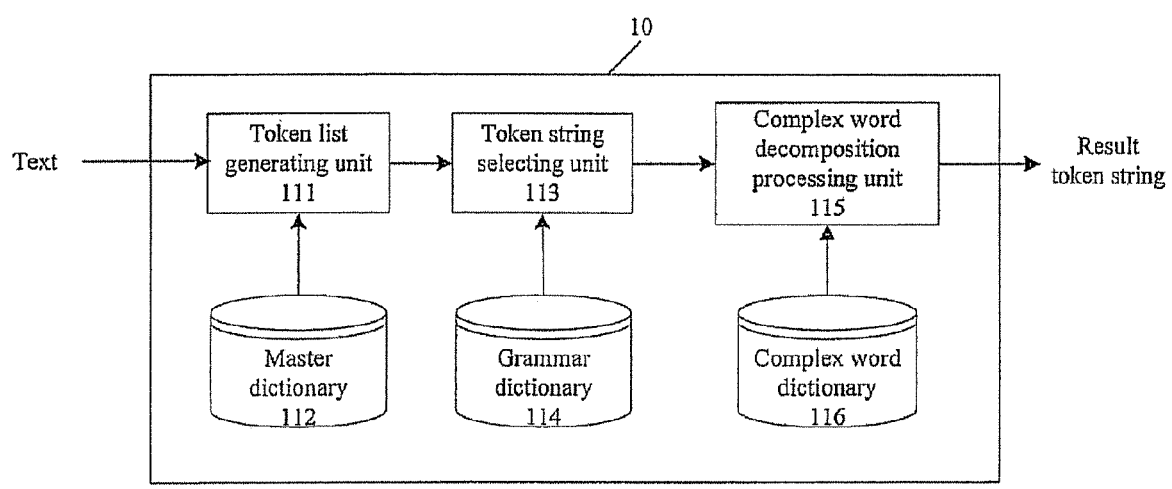
FIG. 11 is a block diagram showing a functional block of the conventional morphological analysis means implemented on the computer.
Figure 12:
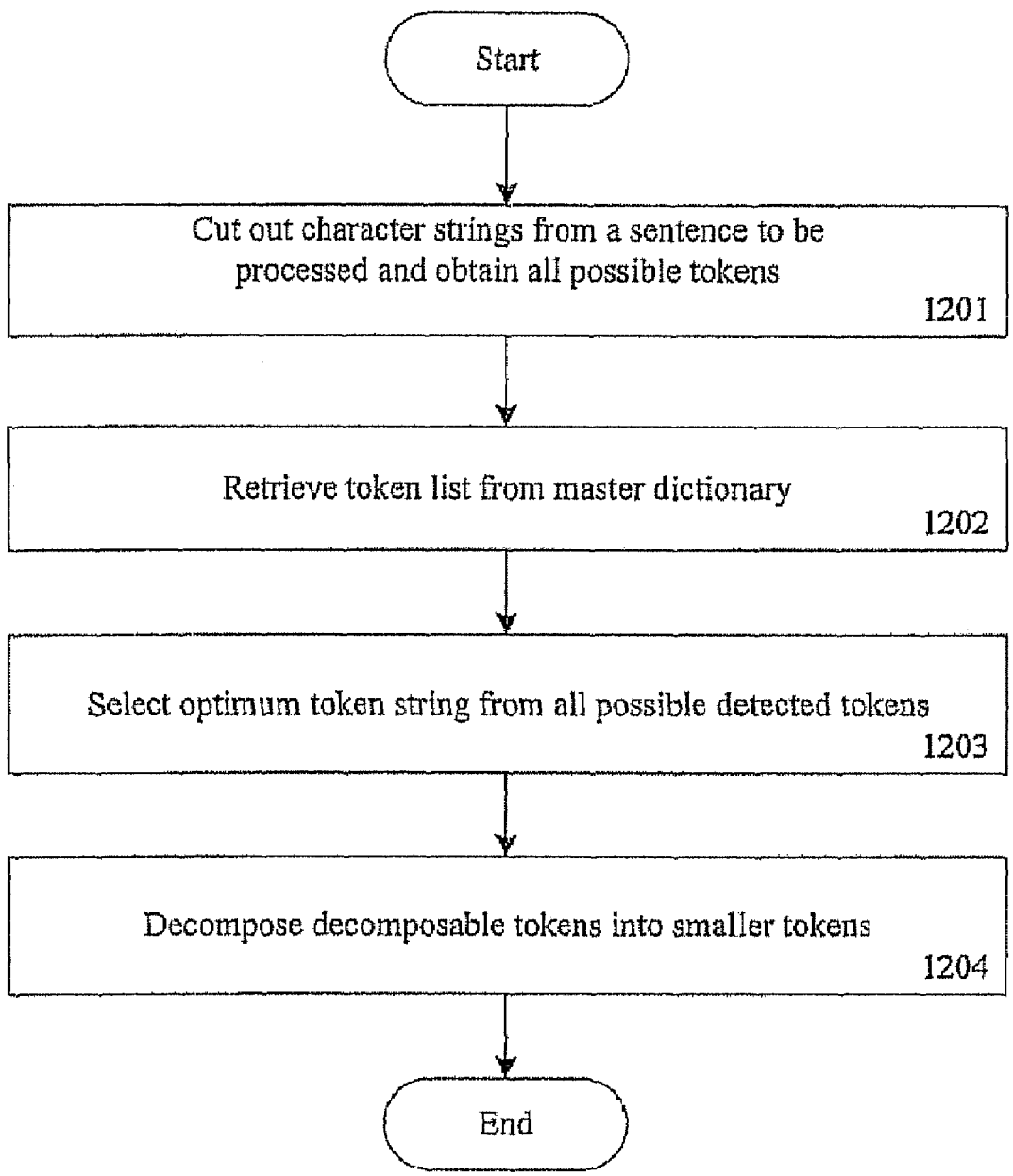
FIG. 12 is a flowchart for schematically explaining a method of the conventional morphological analysis.

FIG. 10 is a block diagram showing an exemplary configuration of a text mining system mounting the morphological analysis engine 10.

Referring to FIG. 10, this text mining system comprises a text database 1001 storing a text group of classification objects, a classification table storage unit 1002 storing a classification table serving as the classification reference of text, a matching processing unit 1003 and a classification execution unit 1004 for making the classification of each text stored in the text database 1001 by referencing the classification table, a morphological analysis unit 1005 for making the morphological analysis as the preprocessing for the matching processing unit 1003, and a classification text database 1006 storing the classified text.

This text mining system can be implemented on one or more computer apparatuses connected via the network. In the configuration as shown in FIG. 10, the text database 1001, the classification table storage unit 1002 and the classification text database 1006 are implemented in the storage means such as a hard disk, and the matching processing unit 1003 and the classification execution unit 1004, which are means for executing the application of text mining, are implemented by the CPU under program control. Also, the morphological analysis engine 10 of this embodiment may be employed as the morphological analysis unit 1005.

In this text mining system, first of all, the text is sequentially read from the text database 1001, and the morphological analysis is performed by the morphological analysis unit 1005. At this time, when the complex word is desired to be classified from the necessity of the text mining (application), the optimum token string is selected from among the token strings not containing the complex word, as shown in FIGS. 6 and 7. From the obtained token strings, the tokens (words) of an independent word such as a noun or adjective are only extracted as the keyword by the matching processing unit 1003. The classification table having registered the word and the category of the text containing the word in association with each other is read out from the classification table storage unit 1002, and the matching of the word extracted from the token string with the word of the classification table is made in accordance with a certain rule.

Then, the category of the noticed text is decided by the classification executing unit 1004 on the basis of the result (percentage of word) of matching by the matching processing unit 1003. The text is stored in the classification text database 1006 in accordance with the decided category.

Though the above embodiment has been described with the morphological analysis in analyzing the natural language sentence described in the language employing a notation method without separation of the words such as Japanese, Chinese or Korean, this invention is also applicable to other languages in the case in which the prefix, suffix, and other complex words can be appropriately decomposed to enhance the performance of processing the natural language sentence.

ADVANTAGES OF THE INVENTION

As described above, with this invention, it is possible to provide efficient decomposition processing of a complex word in processing of decomposing a sentence into words in the context of morphological analysis to enhance the execution efficiency of the overall processing.

Also, with this invention, it is possible to enable an assurance of optimum token strings obtained as an analysis result when the complex word is decomposed.

Moreover, with this invention, it is possible to reduce a time taken to make the generation and maintenance of the complex word dictionary.

Description Of Symbols

10 Morphological analysis engine
11 Token list generating unit
12 Master dictionary
13 Token string selecting unit
14 Grammar dictionary
101 CPU
102 M/B chip set
103 Main memory
105 Hard disk
106 Network interface
801, 1001 Text databases
802 Index file generating unit
803 Text retrieving unit
804, 902, 1005 Morphological analysis units
805 Text input unit
806 Retrieval result output unit
901 Original input unit
903 Syntactic analysis unit
904 Syntax conversion unit
905 Translation generating unit
906 Translation output unit
1002 Classification table storage unit
1003 Matching processing unit
1004 Classification execution unit
1006 Classification text database

What is claimed is:

1. A method of performing morphological analysis on a natural language text string using a computer having a memory, the method comprising:
    selecting, using a processor, whether or not to decompose a decomposable complex word in response to a request from a natural language processing application that utilizes a morphological analysis result;
    receiving the natural language text string to be processed, wherein the text string is in an agglutinative language and comprises more than one complex word, wherein each complex word comprises a linguistic unit having a semantic meaning;
    decomposing the received text string into tokens and storing the tokens in a work area of the memory;
    when it is selected not to decompose a decomposable complex word, determining whether each token is decomposable;
    if a token is not decomposable, registering the non-decomposable token on a token list stored in a given area of the memory;
    generating token strings based on the token list and storing the token strings in the work area of the memory;
    selecting optimum token strings from the generated token strings; and
    outputting the selected optimum token strings to the natural language processing application for further processing.

2. The method of claim 1, wherein a master dictionary is referenced when decomposing the text string into tokens.

3. The method of claim 1, wherein a grammar dictionary is referenced when selecting the optimum token string on the basis of the token list.

4. The method of claim 1, wherein the agglutinative language comprises Japanese.

5. The method of claim 1, wherein the natural language processing application including at least one of a text retrieval processing application, a machine translation processing application, and a text mining processing application.

6. The method of claim 2, wherein whether a token is decomposable is determined by determining whether a decomposable flag for the token in the master dictionary is set.

7. A computer system for performing morphological analysis on a natural language text string, the computer system comprising:
    a memory; and
    a processor configured to:
        select whether or not to decompose a decomposable complex word in response to a request from a natural language processing application that utilizes a morphological analysis result;
        receive the natural language text string to be processed, wherein the text string is in an agglutinative language and comprises more than one complex word, wherein each complex word comprises a linguistic unit having a semantic meaning;
        decompose the received text string into tokens and storing the tokens in a work area of the memory;

when it is selected not to decompose a decomposable complex word, determine whether each token is decomposable;

if a token is not decomposable, register the non-decomposable token on a token list stored in a given area of the memory;

generate token strings based on the token list and storing the token strings in the work area of the memory;

select optimum token strings from the generated token strings; and output the selected optimum token strings to the natural language processing application for further processing.

8. A computer-readable medium, having stored thereon a computer program having a plurality of code sections executable by a computer for causing the computer to perform the steps of:

selecting whether or not to decompose a decomposable complex word in response to a request from a natural language processing application that utilizes a morphological analysis result;

receiving the natural language text string to be processed, wherein the text string is in an agglutinative language and comprises more than one complex word, wherein each complex word comprises a linguistic unit having a semantic meaning;

decomposing the received text string into tokens and storing the tokens in a work area of a memory of the computer;

when it is selected not to decompose a decomposable complex word, determining whether each token is decomposable;

if a token is not decomposable, registering the non-decomposable token on a token list stored in a given area of the memory;

generating token strings based on the token list and storing the token strings in the work area of the memory;

selecting optimum token strings from the generated token strings; and outputting the selected optimum token strings to the natural language processing application for further processing.

* * * * *